Figure 1:
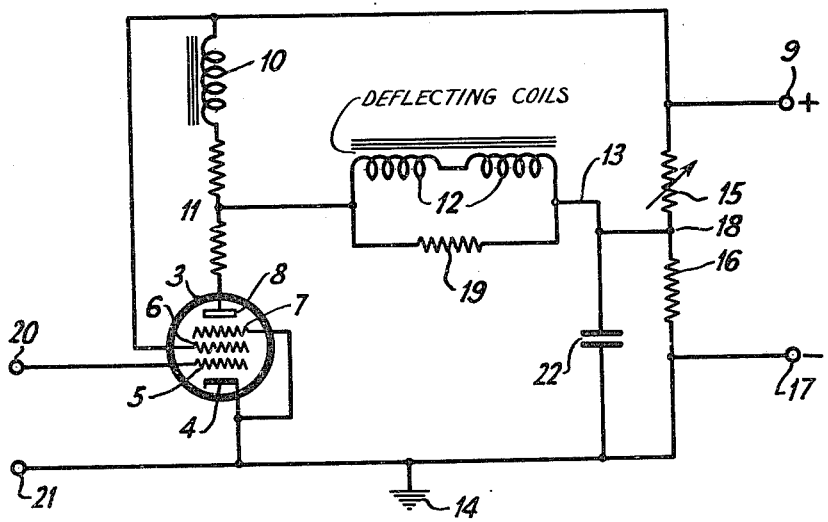

July 13, 1948.   R. D. BOADLE ET AL   2,445,017
DEFLECTING CIRCUIT FOR CATHODE-RAY TUBES
Filed April 12, 1946

INVENTORS
RONALD DEAN BOADLE
IAN ALISTER HOOD
BY
ATTORNEY

UNITED STATES PATENT OFFICE 2,445,017

DEFLECTING CIRCUIT FOR CATHODE-RAY TUBES

Ronald Dean Boadle and Ian Alistair Hood, Sydney, Australia, assignors to Amalgamated Wireless (Australasia) Limited, Sydney, Australia, a company of Australia Application April 12, 1946, Serial No. 661,490
In Australia September 14, 1945

6 Claims. (Cl. 315—27)

The present invention relates to deflecting circuits for cathode ray tubes and more particularly to means for ensuring accurate electrical centering of the cathode ray beam over a wide range of variation in either sweep length or sweep repetition frequency.

The invention is primarily, but not specifically, intended for use in position indication systems of the pulse type having means for determining both the direction of, and the distance to, a target or other pulse reflecting object.

Such systems comprise a rotating directive antenna that may be either the transmitting antenna or the receiving antenna or both, and they further comprise a suitable indicator such as a cathode ray tube having means for radially deflecting the cathode ray in a direction that changes in synchronism with change in the antenna position.

Usually the cathode ray indicating tube is provided with a pair of deflecting coils which are mechanically rotated around the axis of the tube in synchronism with the rotation of the antenna. The arrangement is such that, in the absence of deflecting potentials, the cathode ray beam is caused to impinge upon approximately the center of the associated fluorescent screen.

A deflecting wave, of predetermined sweep length and applied to the rotating deflecting coils, contains a direct current component such that the cathode ray is deflected from the center of the screen towards the circumference thereof at a known radial rate.

The cathode ray deflection or sweep is initiated simultaneously with the transmission of each short pulse of radio frequency energy from the rotating antenna and the radio pulse is reflected if it strikes a reflecting object. The reflected pulse is picked up by the receiver, located near the pulse transmitter, and after amplification and demodulation is employed momentarily to vary the intensity of the cathode ray beam during its radial deflection.

As the cathode ray tube is normally biassed to beam current cut off in the absence of reflected signal energy, the application of a signal pulse to the control electrode serves to produce a luminous spot on the fluorescent screen. This spot has an angular position depending upon the direction of the reflecting object from the transmitting antenna, and has a radial position (distance from the center of the screen) depending upon the distance of said object from said transmitting antenna.

By providing on the fluorescent screen of the cathode ray tube a distance scale suitably calibrated in accordance with the rate at which the cathode ray beam is being radially deflected across said screen, the actual distance, corresponding to the position at which the spot indicating the reflected pulse occurs in the radial deflection, may be read directly from the screen.

In systems of this type, in order to secure the greatest accuracy in operation, it is essential that the cathode ray beam should commence each radial deflection or sweep from precisely the same point on the fluorescent screen. This condition may be readily obtained, for certain related values of sweep length and sweep repetition frequency, by connecting the deflecting coils in the well known so called "balanced bridge" deflecting circuit and by adjusting the constants of the arms of the bridge until all static current through the deflecting coils, in the absence of deflecting potentials, is reduced to zero.

It has been found however, that when the length of the sweep is varied in order to enable the indicating tube to cover a greater or lesser field of direction and distance indication, or when the sweep repetition frequency is varied either intentionally or unintentionally, that a static current is caused to flow in the deflecting coils which upsets the electrical centering of the beam and causes the starting point of the deflection sweep to be displaced from the desired position which, in the present example, is the center of the screen.

It will be obvious therefore that, if undesirable inaccuracies in indication are to be avoided, the deflecting circuit must be manually adjusted to the condition of electrical balance for each variation in sweep length or repetition frequency.

The object of the present invention is to overcome this disadvantage by providing means for accurately maintaining the electrical centering of the cathode ray beam throughout a wide range of variation in sweep length or sweep repetition frequency. The above objective is achieved in accordance with the present invention by providing, in a deflecting circuit for a cathode ray tube, means for electrically balancing the static current flowing through the deflecting coil pair of the absence of deflecting potentials, and means, connected in series with said deflecting coil pair, for providing a path of low resistance to current flow in one direction through said deflecting coil pair and a path of high resistance to current flowing in the opposite direction through said coil pair.

More specifically, the present invention consists of a deflecting circuit for a cathode ray tube comprising an electric discharge device having an anode, a cathode and at least one intervening grid electrode, said anode being connected, through an impedance unit, to a positive potential supply source and said cathode being connected to said positive potential supply source through a resistive network and a pair of deflecting coils and a device of unilateral conductivity serially connected between said anode and an intermediate point on said resistive network.

Figure 2:
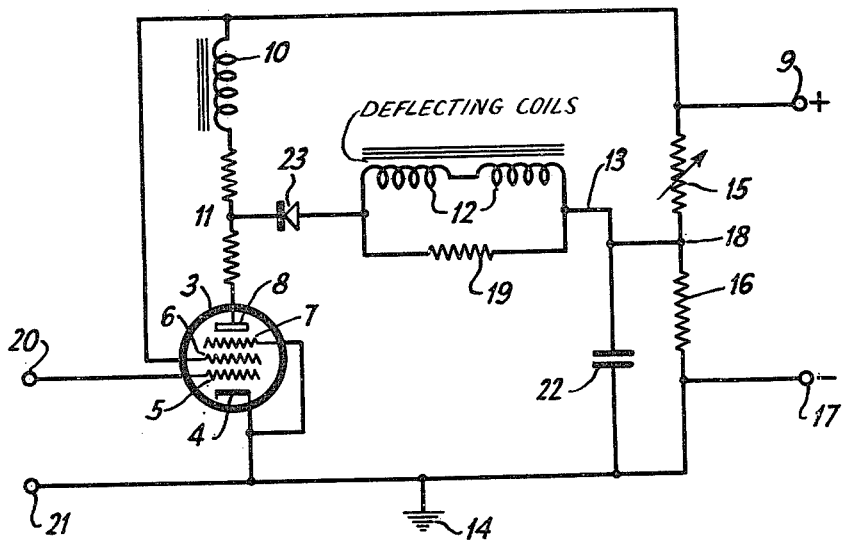

For a more complete understanding of the invention and the manner in which it is to be carried out, attention is now directed to the following description in connection with the accompanying drawing in which:

Figure 1 illustrates a conventional bridge circuit for balancing out the direct current component in the deflecting coil of an electromagnetic timebase; and Figure 2 is a modification of Figure 1 incorporating the present invention.

It will be appreciated that, in order to simplify the description, the drawings show only that portion of the circuit of a cathode ray deflecting system which is necessary for an understanding of the invention.

Referring to the drawings in which like parts are indicated by similar reference numerals there is shown in Figure 1 a conventional circuit employed in electromagnetic deflecting systems for balancing out the direct current component in the deflecting coil.

An output tube 3, which in the circuit illustrated is of the pentode type, includes a cathode 4, a control grid 5, a screen grid 6, a suppressor grid 7, and an anode 8. The desired operating potential from the positive terminal 9 of the potential supply source (not shown) is applied to the anode 8 of the output tube 3 through a choke coil 10 and the resistor 11. The resistor 11 may be omitted providing the then remaining choke coil 10 has a suitable value of resistance.

One free end of a pair of deflecting coils 12, which are employed in any convenient manner to deflect the beam of a cathode ray tube (not shown), is connected to the anode 8 either directly or through a portion of the resistor 11. The other free end of the deflecting coil pair 12, which will be referred to as the low potential end, is connected through a conductor 13 and condenser 22 to ground 14 and thence to the cathode 4 of the output tube 3.

The above mentioned connections couple the deflecting coils 12 across the output electrode of the tube 3 whereby sawtooth current may flow therethrough. The deflecting coils may of course be connected either in series as illustrated or in parallel.

For the purpose of centering the electron beam of the cathode ray tube (not shown) a resistance network comprising the resistors 15, 16 in series is connected between the upper end of the choke coil 10 and ground 14. It will be noted that ground 14 is also common to the cathode 4 of the tube 3 and to the negative terminal 17 of the potential supply source. Therefore, the grounded end of the resistor 15 is connected to a point in the circuit which is negative with respect to the anode 8 of the output tube 3.

The centering circuit is completed by the connection of the low potential end of the deflecting coils 12 to an intermediate point 18 on the resistance network 15, 16.

Although in the present example the resistance network is shown as two separate resistances connected in series, and the low potential end of the deflecting coils 12 is connected to the junction point of these two resistors, it is to be understood that a single resistance potentiometer may be employed instead of the resistors 15, 16, and the low potential end of the deflecting coils connected to said resistance potentiometer through a variable tapping point.

The point 18 is so selected that by varying the ratio of the impedances of the resistor sections on each side of the tapping point 18, as for example by moving the tapping point or by varying the value of one resistor unit (such as the unit 15 indcated as variable on the drawing), the direct current flowing through the deflecting coils 12, in the absence of deflecting potentials, may be reduced to zero or caused to flow in either direction.

The manner in which direct current through the deflecting coils 12 may be balanced out or caused to flow in either direction is as follows. As previously pointed out, the anode end of the choke coil 10 is negative with respect to its other end, due to the flow of plate current therethrough.

It is evident that, at some point on the resistance network 15, 16 the potential is the same as that of the anode end of the choke coil 10. Therefore, if the tap 18 is moved to this position, or if the value of the resistance 15 is adjusted to produce this condition, there will be no flow of direct current through the deflecting coils 12.

If the tap 18 is moved upward from the illustrated position, or if the value of the resistance section 15 is reduced, direct current will flow through the deflecting coils 12 towards the anode end thereof while, if the tap 18 is moved downward from the illustrated position, or if the value of the resistance 15 is increased, direct current will flow through the deflecting coils 12 in the opposite direction, i. e., towards the low potential end of said coils. Similar conditions may be obtained by fixing the relative values of the resistors 15, 16 and varying the value of that portion of resistance 11 that is located between the anode end of the deflecting coils 12 and the choke coil 10.

From the foregoing description of Figure 1, it will be seen that the choke coil 10 (with or without additional resistance 11), the tube 3 and the resistors 15, 16 form the four arms of a Wheatstone bridge, and that the deflecting coils 12, together with the parallel connected damping resistor 19, are connected across said bridge. Adjustment of the resistance in either the arm 10 or the arm 15 may be used to reduce the current through the coils to zero with no signal input.

On applying a suitable input to the terminals 20, 21 of the tube 3, a saw-tooth current will flow through the deflecting coils thus deflecting the beam of an associated cathode ray tube across its fluorescent screen. Since the inductance of the choke coil 10 is made high, there is a comparatively small increase in current in this arm of the bridge, the major portion flowing in the circuit which includes the tube 3, the deflecting coils 12 and the resistance 15. During flyback periods the voltage built up across the deflecting coils 12 is discharged through the damping resistance 19 but the voltage built up across the choke coil 10 tends to discharge through the long time constant path comprising the deflecting coils 12 and the resistance 15. Thus reversing the current in the deflecting coils 12.

At low repetition rates, where there is a considerable interval between one sawtooth current wave and the next, this reverse current through the deflecting coils 12, due to the potential developed across the choke coil 10, causes no trouble. If, however, the frequency of repetition, or the duration of the sweep, is increased beyond a limited value determined by the time constant of the discharge path for the choke coil 10, the reverse current above referred to has not sufficient time to fall to zero between operating cycles and current will still be flowing in the deflecting coils 12 when the next deflecting cycle commences. Consequently the electrical centering of the cathode ray beam is affected and the starting point of the traces is displaced from the required position. In order to correct for these conditions it is necessary to vary the impedance ratio of the resistance sections 15, 16 or, in other words, it is necessary to unbalance the bridge. It has been found that, if a device 23 of unilateral conductivity, such as a thermionic diode rectifier or a metallic rectifier, is connected across the bridge as shown in Figure 2 and in series with the deflecting coils 12, so as to provide a path of low resistance for the normal deflecting currents through the deflecting coils 12 and a path of high resistance for the reverse currents produced by the voltages developed across the choke coil 10, then the electrical balance of the circuit and hence the electrical centering of the cathode ray beam remains constant over a wide range of variation in either sweep length or sweep repetition frequency.

With a metallic rectifier or like device 23 connected as shown in Figure 2 the voltages developed across the choke coil 10 are discharged during the flyback period through two paths of short time constant; one of these paths being through the high internal resistance of the tube 3 and the other path being through the high back resistance of the device 23, the deflecting coils 12 and the resistance 15. Where, however, the device 23 is a thermionic diode, only one discharge path is available for the voltage built up across the choke coil 10. Due to the unidirectional conductivity of the thermionic diode, the path for the reverse current through the deflecting coils 12 and resistance 15 is open circuited and the discharge takes place through the high internal impedance of the tube 3. The discharge is thus completed in a very short period, and the centering of the cathode ray is unaffected by changes in either sweep duration or repetition frequency.

The above invention is described as applicable to distance and direction measurements in which a cathode ray tube is used and in which the cathode ray beam in the tube is deflected radially from the geometric of the tube. The invention, however, is not solely applicable to such an installation since it is entirely conceivable that the same problems would arise where a cathode ray beam is electromagnetically deflected by a similar circuit arrangement and in which the deflections occur in the usual manner across the face of the tube from one side to the other. When the rectifier 23 is included in the circuit for so deflecting the cathode ray beam, the rate of deflection as well as the amplitude of deflection may be changed individually or simultaneously without effecting the point at which the cathode ray beam begins its useful deflection. Accordingly, the present invention, including the use of the rectifier or unilateral conducting device 23, assures that an electromagnetically deflected cathode ray beam is returned to substantially the same starting point regardless of rate of deflection or amplitude of deflection.

Having now fully described and ascertained our said invention and the manner in which it is to be performed, we declare that what we claim is:

1. In a beam deflecting circuit for cathode ray apparatus, an arrangement for accurately maintaining electrical centering of a cathode ray beam throughout a wide variation in beam sweep length and sweep repetition frequency, comprising an arrangement including an electron discharge device having an anode, a cathode and at least one intervening grid electrode, means for connecting said anode to the positive terminal of a source of potential through an impedance unit, said cathode being connected to the negative terminal of the source of potential and to said positive terminal through a resistive network, and a pair of beam deflecting coils and a device of unilateral conductivity serially connected between said anode and an intermediate point on said resistive network.

2. An arrangement according to claim 1 and wherein said electron discharge device, impedance unit and resistive network constitute the arms of a Wheatstone bridge and said serially connected coils and unilateral conducting device constitute a diagonal of said bridge.

3. An arrangement as defined in claim 1 and wherein said intermediate point on the resistive network is variable in an electrical sense.

4. An arrangement according to claim 1 wherein said unilaterally conductive device is a rectifier.

5. A circuit arrangement for deflecting a cathode ray beam in a cathode ray tube comprising a deflection tube having a cathode, a control electrode and an anode, means to connect the cathode to the negative terminal of a source of potential, means including an impedance to connect the anode to the positive terminal of the source of potential, the cathode ray beam deflection coil, a unilateral conducting device, and means for connecting the deflecting coil and unilateral conducting device in series between the anode of said deflection tube and an adjustable point along the source of potential thereby to assure that the cathode ray beam is returned to substantially the same point after each useful deflection stroke even though the amplitude of deflection may be altered.

6. A circuit arrangement for deflecting a cathode ray beam in a cathode ray tube and for assuring that the cathode ray beam is returned to substantially the same point after each deflection stroke regardless of beam deflection frequency or amplitude comprising a deflection tube having a cathode, a control electrode and an anode, means including an impedance to connect the anode to the positive terminal of a source of potential, means to connect the cathode to the negative terminal of the source of potential, a resistance element connected across the source of potential, a cathode ray beam deflection coil, a rectifier element, and means for connecting the deflection coil and the rectifier in series between the anode of said deflection tube and a point of adjustable potential along the said resistance.

RONALD DEAN BOADLE.
IAN ALISTAIR HOOD.

REFERENCES CITED

The following references are of record in the file of this patent:

UNITED STATES PATENTS

| Number | Name | Date |
|---|---|---|
| 2,074,495 | Vance | Mar. 23, 1937 |
| 2,153,655 | Urtel et al. | Apr. 11, 1939 |
| 2,182,608 | Andrieu | Dec. 5, 1939 |